(12) United States Patent
Wu et al.

(10) Patent No.: US 12,197,105 B2
(45) Date of Patent: Jan. 14, 2025

(54) FOLLOW-FOCUS WHEEL ASSEMBLY, HANDHELD DEVICE AND PHOTOGRAPHING SYSTEM

(71) Applicant: SZ DJI TECHNOLOGY CO., LTD., Shenzhen (CN)

(72) Inventors: Qiongwei Wu, Shenzhen (CN); Zhenhua Xu, Shenzhen (CN); Jian Yang, Shenzhen (CN); Shimeng Bei, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 191 days.

(21) Appl. No.: 17/734,101

(22) Filed: May 1, 2022

(65) Prior Publication Data

US 2022/0260890 A1 Aug. 18, 2022

Related U.S. Application Data

(63) Continuation of application No. 17/114,415, filed on Dec. 7, 2020, now Pat. No. 11,347,132, and a continuation of application No. PCT/CN2019/095647, filed on Jul. 11, 2019.

(51) Int. Cl.
*G03B 13/18* (2021.01)
*G03B 17/56* (2021.01)
*H04N 23/67* (2023.01)

(52) U.S. Cl.
CPC ........... *G03B 13/18* (2013.01); *G03B 17/563* (2013.01); *H04N 23/67* (2023.01)

(58) Field of Classification Search
CPC .................................................. G03B 17/563
See application file for complete search history.

(56) References Cited

U.S. PATENT DOCUMENTS

| 6,369,849 B1 * | 4/2002 | Rzyski | H04N 23/58 |
| | | | 348/82 |
| 6,707,501 B1 * | 3/2004 | Mckay | H04N 23/50 |
| | | | 348/E5.025 |

(Continued)

FOREIGN PATENT DOCUMENTS

| CN | 201936055 U | 8/2011 |
| CN | 204887205 U | 12/2015 |
| CN | 105974551 A | 9/2016 |

(Continued)

*Primary Examiner* — Noam Reisner
(74) *Attorney, Agent, or Firm* — FIDELI LAW PLLC (57) ABSTRACT

A handheld follow-focus device may include a single handheld structure including a mounting part at a first side of the handheld structure, including an operation port and a control panel, and a handheld part at a second side of the handheld structure; a connecting part configured to connect to a photographing device; and a follow-focus wheel in the mounting part and partially extending out of the operation port to adjust, through rotation, a focus of the photographing device, where a position of the follow-focus wheel and a position of the control panel is arranged to allow a user to operate on the control panel while performing a focusing operation to the follow-focus wheel with a single hand. The device has a simple and compact structure, and can be miniaturized. It meets the requirement of performing a focusing operation with a single hand.

20 Claims, 8 Drawing Sheets

(56) References Cited

U.S. PATENT DOCUMENTS

2018/0238423 A1\* 8/2018 Ye .................... F16H 57/0025
2020/0404127 A1\* 12/2020 Zeng .................... G03B 17/38

FOREIGN PATENT DOCUMENTS

| CN | 205622741 U | 10/2016 |
| CN | 208015859 U | 10/2018 |
| WO | 2016165115 A1 | 10/2016 |

\* cited by examiner

FOLLOW-FOCUS WHEEL ASSEMBLY, HANDHELD DEVICE AND PHOTOGRAPHING SYSTEM

RELATED APPLICATIONS

This application is a continuation application of U.S. application Ser. No. 17/114,415, filed on Dec. 7, 2020, which is a continuation application of PCT application No. PCT/CN2019/095647, filed on Jul. 11, 2019, and the contents of the foregoing documents are incorporated herein by reference in their entireties.

TECHNICAL FIELD

The present disclosure relates to the field of control technologies, and in particular, to a follow-focus wheel assembly, and a handheld device and a photographing system using the follow-focus wheel assembly.

BACKGROUND

Damp control knobs can be widely applied to industrial machinery and digital products, for example, controllers of camera devices in the film and television industry, such as a follow focus, a wheel, and a somatosensory controller. They are able to adjust precise positions. Moreover, the control knobs have a good hand feeling in control.

Currently, common follow-focus wheel structures used for follow focuses may be grouped into two categories: one category is an external follow-focus wheel module of an electronic device, where an independent follow-focus wheel module is connected to an electronic device through an interface; the other category is a follow-focus wheel structure integrally designed with a handle or a handheld device.

However, existing external follow-focus wheel modules have high costs and occupy limited plug-in interfaces of electronic devices, affecting the overall appearance. Moreover, the plug-in follow-focus wheel modules are large in size and need to be operated by two persons or with both hands, making the operation complex. The integrated follow-focus wheel structure has the problems of poor structural strength and stability in a limited space of the electronic device, and is inconvenient to assemble/disassemble and repair.

SUMMARY

Embodiments of the present disclosure provide a miniaturized follow-focus wheel assembly with a compact structure. The follow-focus wheel assembly can be mounted in an electronic product as required, to solve the problems of the follow-focus wheel structures used in the existing electronic devices as mentioned in the background. In addition, the embodiments of the present disclosure further provide a handheld device and a photographing system that use the follow-focus wheel assembly.

According to an aspect, some embodiments of the present disclosure provide a follow-focus wheel assembly, including a supporting member, configured to connect an external structure, including a supporting seat and a mounting seat extending outward from the supporting seat; a follow-focus plate, located on one sides of the mounting seat; and a follow-focus wheel, located another side of the mounting seat, passed through a through hole on the mounting seat, and rotatably connected to the follow-focus plate, wherein the follow-focus wheel partially extends out of the external structure when the supporting member is connected to the external structure.

By disposing a follow-focus plate and a follow-focus wheel on two sides of a supporting seat, the follow-focus wheel assembly provided in the present disclosure has a simple and compact structure and can be miniaturized. When being applied to an electronic product, the follow-focus wheel assembly can meet the requirement of performing a focusing operation with a single hand. Due to the simple structure, the structural strength and stability are improved while the operation cost and production cost can be effectively reduced. Moreover, assembly and disassembly are convenient.

According to another aspect, some embodiments of the present disclosure provide a handheld device, including a handheld structure, including: a first housing, and a second housing coupled with the first housing to form a handheld part and a mounting part, wherein the mounting part includes a mounting cavity, and the first housing includes an operation port in communication with the mounting cavity at a position corresponding to the mounting cavity; and a follow-focus wheel assembly fixed in the mounting cavity, including: a supporting member configured to connect an external structure, including a supporting seat and a mounting seat extending outward from the supporting seat, a follow-focus plate, located on one sides of the mounting seat; and a follow-focus wheel, located another side of the mounting seat, passed through a through hole on the mounting seat, rotatably connected to the follow-focus plate, and partially extended out of the operation port, wherein the follow-focus wheel partially extends out of the external structure when the supporting member is connected to the external structure.

The handheld follow-focus wheel device provided in the present disclosure has a simple and compact structure and can be miniaturized by using the foregoing follow-focus wheel assembly, and can meet the requirement of performing a focusing operation with a single hand. Due to the simple structure, the operation cost and production cost can be effectively reduced while the structural strength and stability are improved. Moreover, assembly and disassembly are convenient.

According to yet another aspect, some embodiments of the present disclosure provide a photographing system. The photographing system includes a camera device; and a handheld device connected to the camera device in a wireless or wired manner to adjust a focus of the camera device, the handheld device including: a handheld structure, including: a first housing, and a second housing coupled with the first housing to form a handheld part and a mounting part, wherein the mounting part includes a mounting cavity, the first housing includes an operation port in communication with the mounting cavity at a position corresponding to the mounting cavity, and a follow-focus wheel assembly fixed in the mounting cavity, including: a supporting member configured to connect an external structure, including a supporting seat and a mounting seat extending outward from the supporting seat, a follow-focus plate, located on one sides of the mounting seat; and a follow-focus wheel, located another side of the mounting seat, passed through a through hole on the mounting seat, rotatably connected to the follow-focus plate, and partially extended out of the operation port, wherein the follow-focus wheel partially extends out of the external structure when the supporting member is connected to the external structure.

With the foregoing handheld follow-focus wheel device, the photographing system provided in the present disclosure can meet the requirement of performing a focusing operation with a single hand, and can effectively reduce the operation cost and production cost while improving the structural strength and stability. Moreover, the assembly and disassembly are convenient.

BRIEF DESCRIPTION OF THE DRAWINGS

To describe the solutions in the embodiments of the present disclosure or in the existing technologies more clearly, the following briefly introduces the accompanying drawings required for describing the embodiments or the existing technologies. Apparently, the accompanying drawings in the following description show some exemplary embodiments of the present disclosure, and a person of ordinary skill in the art may still derive other drawings from these accompanying drawings without creative efforts.

DESCRIPTION OF REFERENCE NUMERALS

Handheld device 1
Camera device 2
First fixing member 10a
Second fixing member 10b
Third fixing member 10c
First housing 12
Second housing 14
Handheld part A
Mounting part B
Third housing 16
Mounting cavity 100
Operation port 100a
Guide positioning part 100b
First fixing part 100c
Second fixing part 100d
Movable clamping part 100e
Supporting part 100f
Shielding member 101
First button structure 102
Second button structure 103
Control panel 142
Connecting part 160
Follow-focus wheel assembly 20
Supporting member 22

-continued

Follow-focus plate 24
Follow-focus wheel 26
Guide member 26a
Guide member 26b
Guide member 26c
Guide member 26d
Guide member 26e
Supporting seat 220
Mounting seat 222
Through hole 224
First step 224a
Second step 224b
Third step 224c
Boss 226
Operation wheel 262
Rotating shaft 264
Sinking slot 266
Locking member 268

DETAILED DESCRIPTION

To make a person skilled in the art better understand the solutions of the present disclosure, the following clearly and fully describes the technical solutions in the embodiments of the present disclosure. Unless otherwise defined, all technical and scientific terms used herein have the same meaning as commonly understood by a person skilled in the technical field of the present disclosure. The terms used in the specification of the present disclosure are only for the purpose of describing specific embodiments, and are not intended to limit the present disclosure.

The "embodiment" mentioned herein means that a specific feature, structure, or characteristic described in combination with an embodiment may be included in at least one embodiment of the present disclosure. This term appearing in different parts of the specification does not necessarily refer to the same embodiment or an independent or alternative embodiment exclusive of other embodiments. It may be explicitly or implicitly appreciated by those skilled in the art that the embodiment described herein may be combined with other embodiments.

Some exemplary embodiments of the present disclosure provide a follow-focus wheel assembly, including a supporting member, a follow-focus plate, and a follow-focus wheel.

The supporting member includes a supporting seat and a mounting seat that is formed by extending outward from the supporting seat; the follow-focus plate and the follow-focus wheel are located on two sides of the mounting seat respectively, and the follow-focus wheel passes through a through hole on the mounting seat and connects to the follow-focus plate in a rotatable manner.

The supporting member is used for connecting an external structure, and the follow-focus wheel assembly is mounted in the external structure via the supporting member, where the follow-focus wheel partially extends out of the external structure when the supporting member is connected to the external structure.

By disposing a follow-focus plate and a follow-focus wheel on two sides of a supporting seat, the follow-focus wheel assembly provided in the present disclosure has a simple and compact structure and can be miniaturized. When being applied to an electronic product, the follow-focus wheel assembly can meet the requirement of performing a focusing operation with a single hand. Due to the simple structure, the structural strength and stability are improved while the operation cost and production cost can be effectively reduced. Moreover, the assembly and disassembly are convenient.

Based on the foregoing follow-focus wheel assembly, some exemplary embodiments of the present disclosure further provide a handheld device, including a handheld structure and the follow-focus wheel assembly.

The handheld structure includes a first housing and a second housing, and the first housing couples with the second housing to form a handheld part and a mounting part, where the mounting part includes a mounting cavity, and the first housing is provided with an operation port in communication with the mounting cavity at a position corresponding to the mounting cavity.

The follow-focus wheel assembly is fixed in the mounting cavity, and the follow-focus wheel partially extends out of the operation port.

The handheld follow-focus wheel device provided in the present disclosure has a simple and compact structure and can be miniaturized by using the foregoing follow-focus wheel assembly, and can meet the requirement of performing a focusing operation with a single hand. Due to the simple structure, the operation cost and production cost can be effectively reduced while the structural strength and stability are improved. Moreover, the assembly and disassembly are convenient.

Based on the foregoing handheld device, some exemplary embodiments of the present disclosure provide a photographing system. The photographing system includes a camera device and the foregoing handheld device. The handheld device is connected to the camera device in a wireless or wired manner, in order to adjust the focus of the camera device when the camera device is used for photography.

By using the foregoing handheld follow-focus wheel device, the photographing system provided in the present disclosure can meet the requirement of performing a focusing operation with a single hand, and can effectively reduce the operation cost and production cost while improving the structural strength and stability. Moreover, the assembly and disassembly are convenient.

In order to make a person skilled in the art to better understand the solutions of the present disclosure, the following clearly and fully describes the technical solutions in the embodiments of the present disclosure with reference to the accompanying drawings in the embodiments of the present disclosure.

Figure 1:
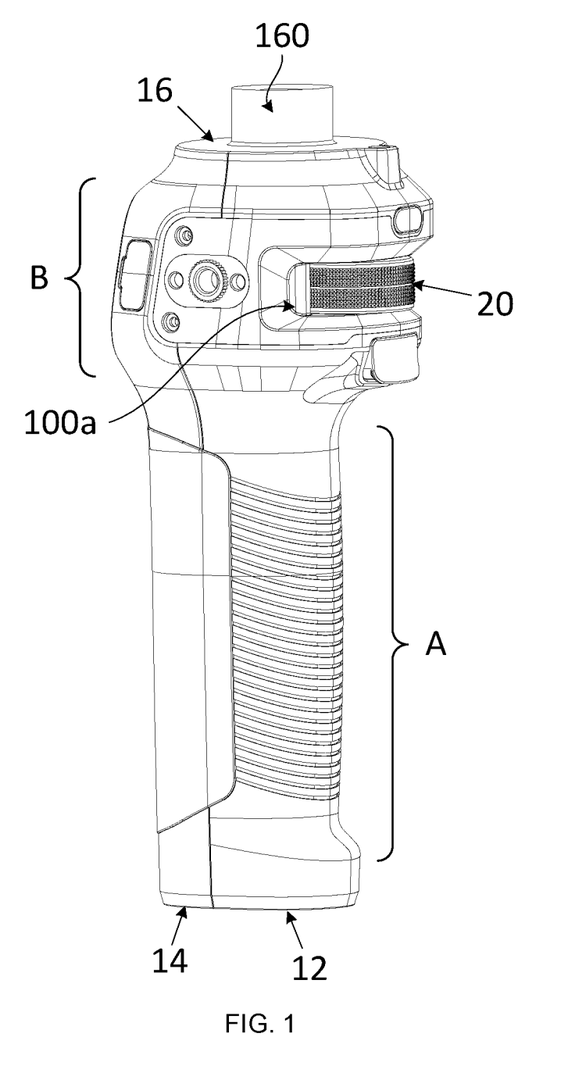
FIG. 1 is an overall schematic view of a handheld device according to some exemplary embodiments of the present disclosure.

Since the follow-focus wheel assembly is installed in an electronic product for use, for ease of description, in the following embodiments, the structure of the follow-focus wheel assembly is described in detail in the embodiments that illustrate the handheld device. Referring to FIG. 1, some exemplary embodiments of the present disclosure provide a handheld device, including a handheld structure and a follow-focus wheel assembly 20; the handheld structure includes a first housing 12 and a second housing 14, the first housing 12 couples with the second housing 14 to form a handheld part A and a mounting part B, and the mounting part B is used for mounting the follow-focus wheel assembly 20.

Figure 2:
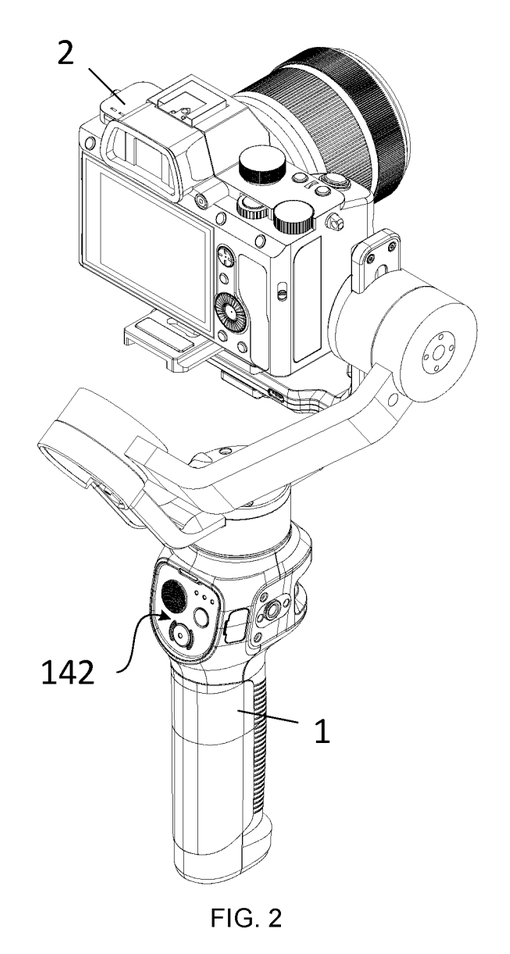
FIG. 2 is a schematic view of a handheld device connected to a camera device according to some exemplary embodiments of the present disclosure.

Moreover, the handheld device shown in FIG. 1 may further include a third housing 16. One side of the third housing 16 is connected to both the first housing 12 and the second housing 14, to couple the first housing 12 and the second housing 14 to form an accommodating space of the follow-focus wheel device. A connecting part 160 is provided on the other side of the third housing 16. The connecting part 160 is used for connecting a controlled external electronic device, such as a camera device. FIG. 2 is a schematic view of a camera device mounted on the connecting part 160. In some exemplary embodiments, the third housing 16 may be a part of the first housing 12 or the second housing 14.

Figure 3:
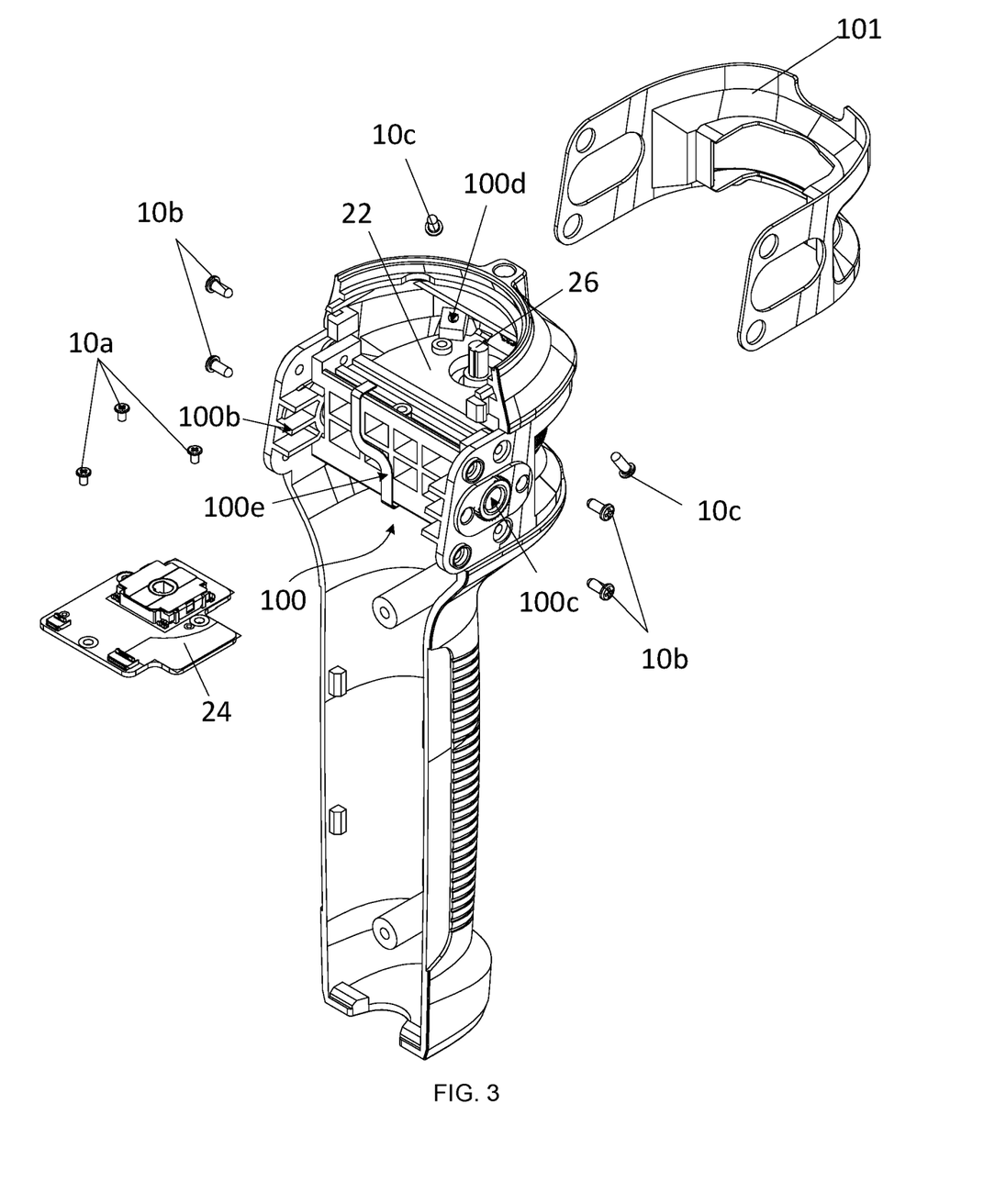
FIG. 3 is a partial exploded view of a handheld device according to some exemplary embodiments of the present disclosure.

In some exemplary embodiments, as shown in the exploded view in FIG. 3 (where the second housing 14 and the third housing 16 have been removed), the mounting part B includes a mounting cavity 100. With reference to FIG. 1, the first housing 12 is provided with an operation port 100*a* in communication with the mounting cavity 100 at a position corresponding to the mounting cavity 100. With reference to the partial cross-sectional view in FIG. 4 (where the second housing 14 and the third housing 16 have been removed), the follow-focus wheel assembly 20 includes a supporting member 22, a follow-focus plate 24, and a follow-focus wheel 26. The supporting member 22 includes a supporting seat 220 and a mounting seat 222 formed by extending outward from the supporting seat 220. The mounting seat 222 may extend outward at any angle from any position of the supporting seat 220, for example, the mounting seat 222 may extend outward from an edge position of the supporting seat 220, with an extension direction perpendicular to the mounting seat 220. The follow-focus plate 24 and the follow-focus wheel 26 are disposed on two sides of the mounting seat 222 respectively, and the follow-focus wheel 26 passes through the through hole 224 on the mounting seat 222 and is then connected to the follow-focus plate 24 in a rotatable manner. The follow-focus plate 24 may be fixed on the mounting seat 222 via a first fixing member 10*a*.

The supporting member 22 may be fixed in the mounting cavity 100, so that the follow-focus wheel assembly 20 as a whole is fixed in the mounting cavity 100, to implement the connection between the follow-focus wheel assembly 20 and the handheld structure, where the follow-focus wheel 26 partially extends out of the operation port 100*a* when the supporting member 22 is fixed in the mounting cavity 100. Of course, the follow-focus wheel assembly 20 provided in this disclosure may be mounted on a structure other than the handheld structure. That is, the follow-focus wheel assembly 20 may be connected, as a module, to another external structure. Specifically, the follow-focus wheel assembly 20 may be connected to the external structure via the supporting member 22, and when the supporting member 22 is connected to the external structure, the follow-focus wheel 26 partially extends out of the external structure.

Figure 4:
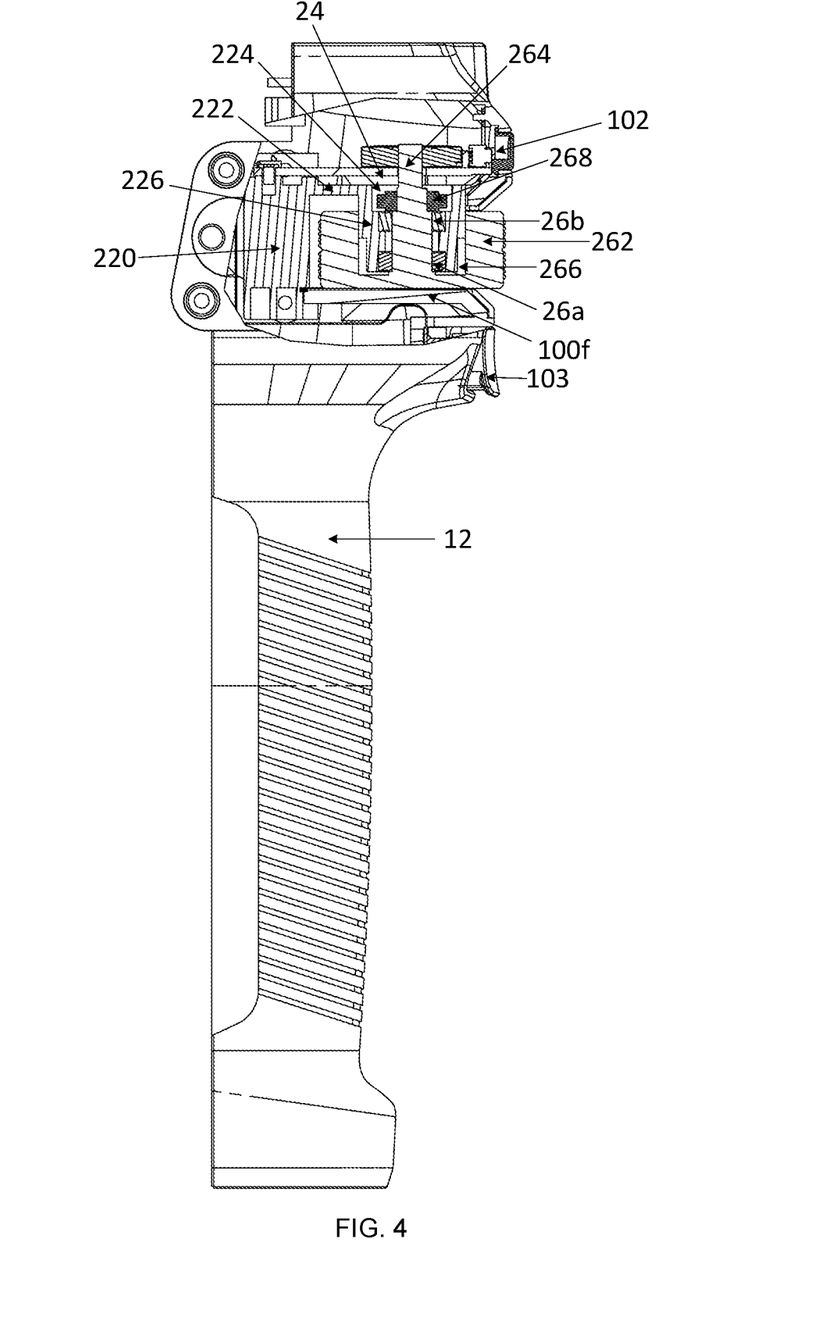
FIG. 4 is a partial cross-sectional view of a handheld device according to some exemplary embodiments of the present disclosure.

Further, in some exemplary embodiments, as shown in FIG. 4:

A boss 226 axially extending outward from an end portion of the through hole 224 is formed on a side of the mounting seat 222 where the follow-focus wheel 26 is disposed, and the through hole 224 penetrates the mounting seat 222 and the boss 226. The boss 226 and the follow-focus wheel 26 are sheathed together. In some exemplary embodiments, as shown in FIG. 4, the follow-focus wheel 26 includes an operation wheel 262 and a rotating shaft 264 that are coaxially connected. A sinking slot 266 coaxial with the rotating shaft 264 is provided on an end surface facing the mounting seat 222 of the operation wheel 262. After the rotating shaft 264 passes through the through hole 224, the boss 226 is wholly or partially located in the sinking slot 266.

Figure 5:
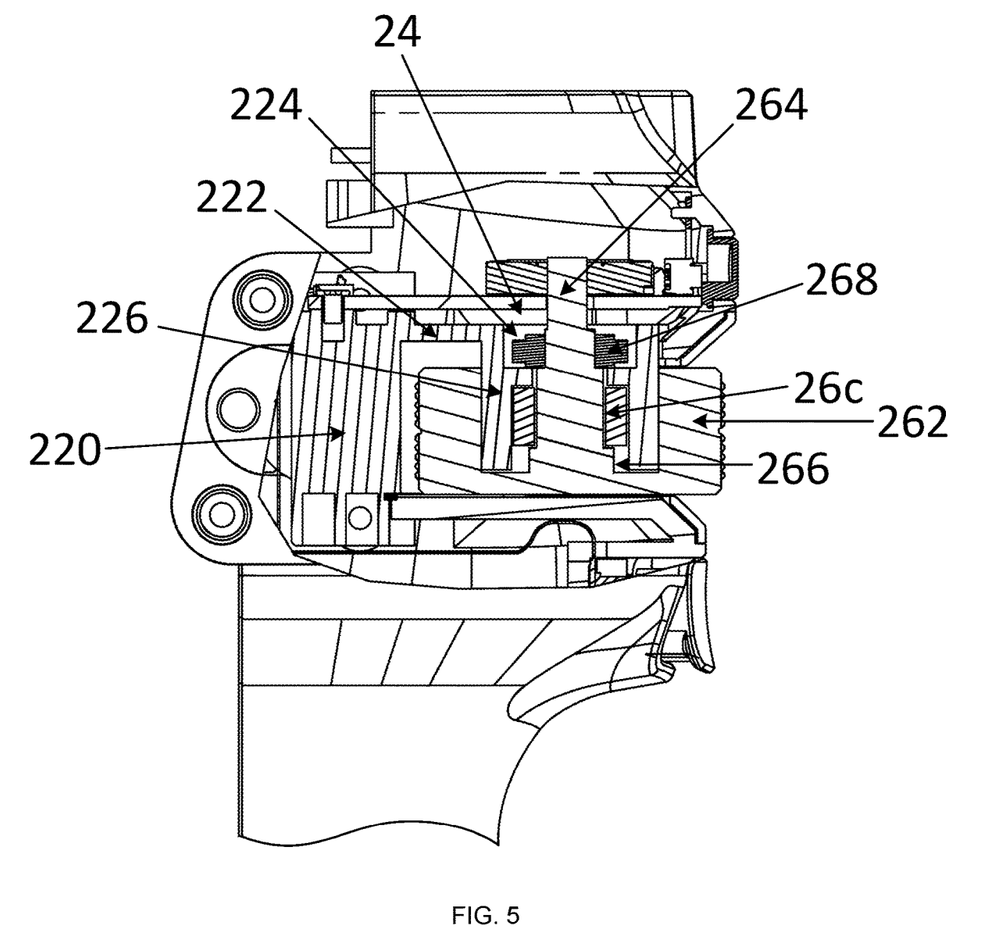
FIG. 5 is a partial cross-sectional view of a handheld device according to some exemplary embodiments of the present disclosure.

In some exemplary embodiments, at least one guide member is further disposed inside the through hole 224, and the at least one guide member is sleeved over the rotating shaft 264, to guide the rotation of the rotating shaft 264. For example, two guide members (26*a*, 26*b*) may be provided as shown in FIG. 3, and one guide member 26*c* may be provided as shown in FIG. 5.

Figure 6:
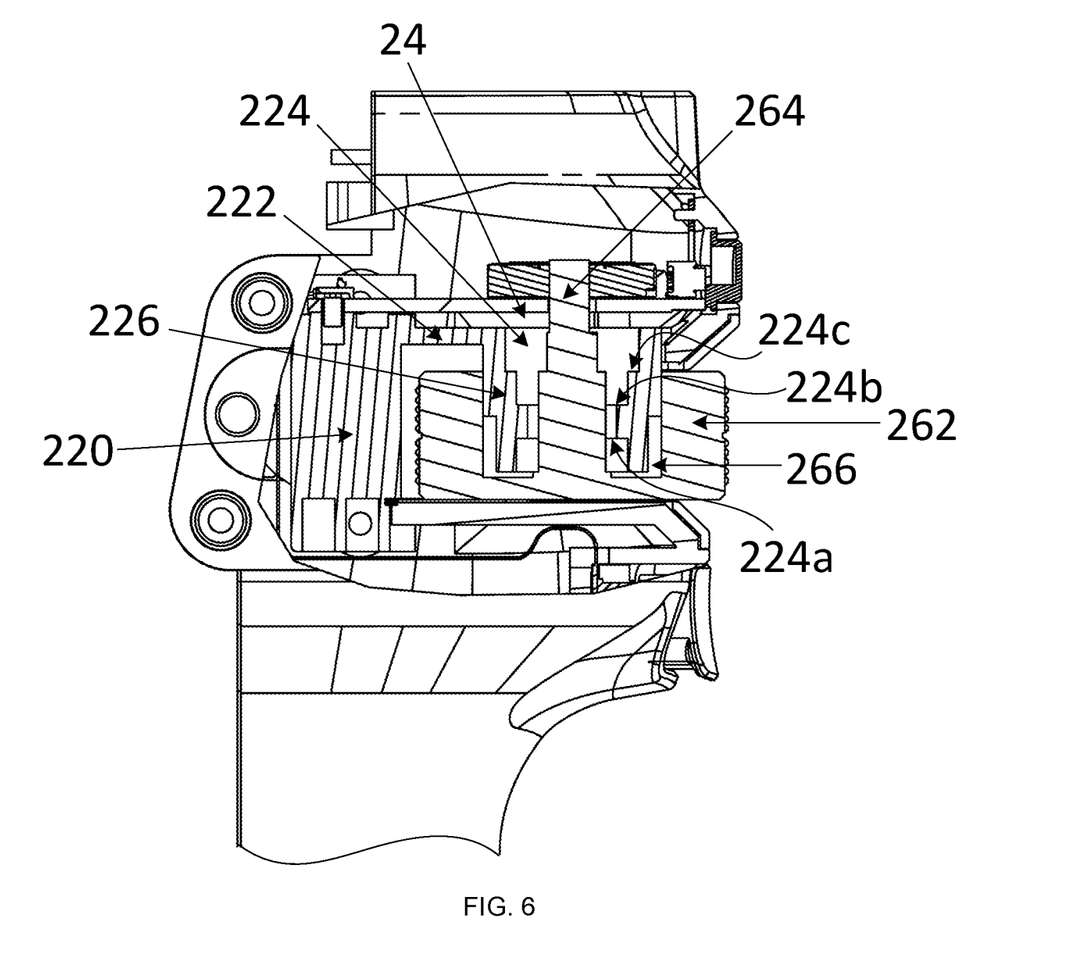
FIG. 6 is a schematic view after removal of a partial structure in FIG. 4.

When the follow-focus wheel assembly 20 in the present disclosure is provided with two guide members (26*a*, 26*b*) as shown in FIG. 3, with reference to FIG. 4 and FIG. 6, the guide members (26*a*, 26*b*) have been removed in the cross-sectional part in FIG. 6 on the basis of FIG. 4, the through hole 224 may be provided with a first step 224*a* at an end away from the follow-focus plate 24, and two ends of the guide member 26*a* in an axial direction abut against the first step 224*a* and the follow-focus wheel 26 respectively. Further, as shown in FIG. 4 and FIG. 6, the follow-focus wheel assembly 20 may further include a locking member 268, the through hole 224 may be further provided with a second step 224*b* at an end close to the follow-focus plate 24, and the locking member 268 fits the second step 224*b* to lock the guide member 26*b*. The locking member 268 can prevent the guide members (26*a*, 26*b*) from moving axially relative to the rotating shaft 264, so that the guide members (26*a*, 26*b*) have a stable guiding effect, which facilitates the rotation of the follow-focus wheel 26, and improves the hand feeling in operation.

Further, as shown in FIG. 6, a third step 224*c* may be provided in the through hole 224. The third step 224*c* is located between the follow-focus plate 24 and the second step 224*b*, and the locking member 268 is located in a space formed by the third step 224*c*. In this way, the structure of the follow-focus wheel assembly 20 becomes more compact, which can facilitate the miniaturization.

In the embodiments of the present disclosure, the guide member may be specifically a bearing.

Figure 7:
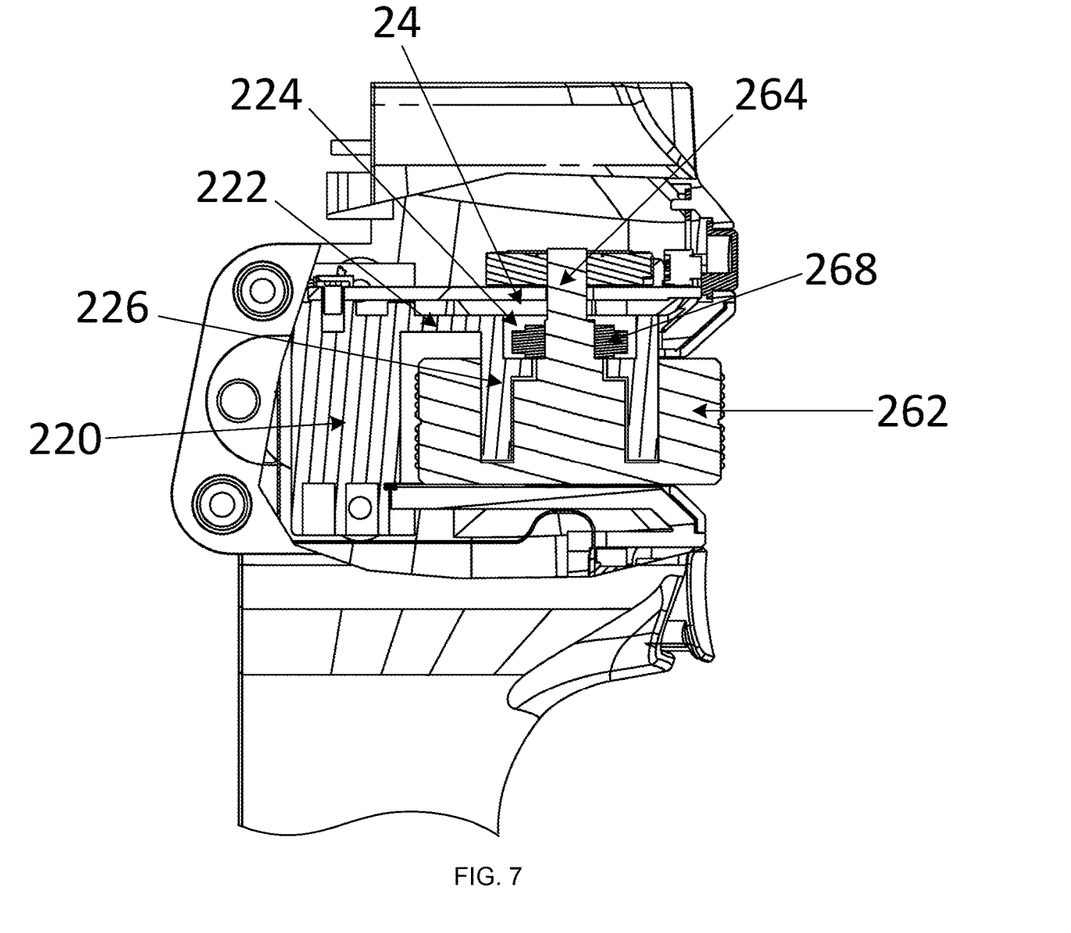
FIG. 7 is a partial cross-sectional view of a handheld device according to some exemplary embodiments of the present disclosure.
Figure 8:
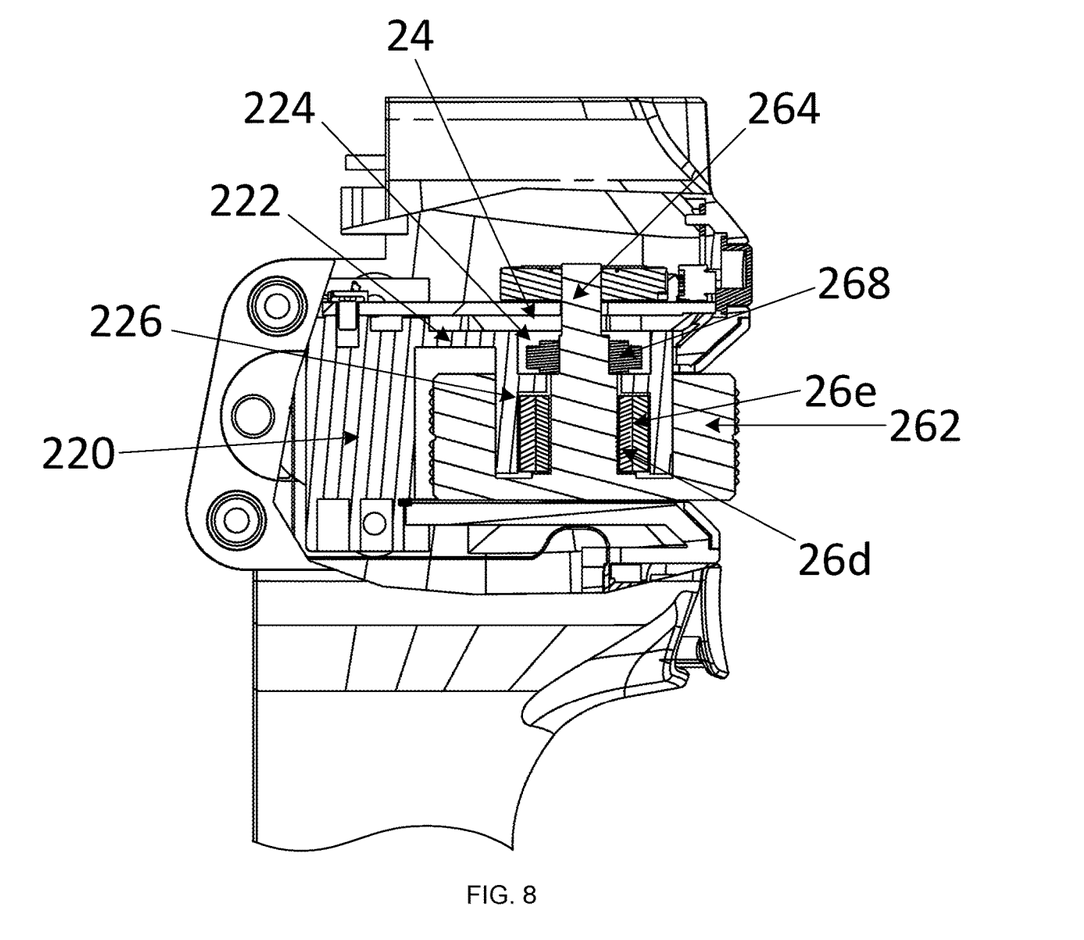
FIG. 8 is a partial cross-sectional view of still another embodiment of a handheld device according to some exemplary embodiments of the present disclosure.

In some exemplary embodiments, as shown in FIG. 7, there may be no guide member between the boss 226 and the rotating shaft 264. In some other embodiments, as shown in FIG. 8, guide members (26*d*, 26*e*) sheathed with each other may be disposed between the boss 226 and the rotating shaft 264. The guide members sheathed with each other may be specifically at least two copper bushes sheathed with each other.

Further, in the embodiments of the present disclosure, as shown in FIG. 1 to FIG. 3, the handheld part A may be a columnar structure, a central axis of the handheld part A is parallel to the rotating shaft 264 of the follow-focus wheel 26, that is, the central axis of the handheld part A is perpendicular to a rotation plane of the follow-focus wheel 26. In some other embodiments, the relative positions of the follow-focus wheel assembly 20 and the handheld structure may be altered, so that the rotation plane of the follow-focus wheel 26 is parallel to the central axis of the handheld part A, or the rotation plane of the follow-focus wheel 26 is at a particular angle with the central axis of the handheld part A, which is not limited herein.

In some exemplary embodiments, as shown in FIG. 3, a guide positioning part 100*b* may be provided on a cavity wall of the mounting cavity 100, the supporting seat 220 may be correspondingly provided with a guide structure (not marked in the figure), and the follow-focus wheel assembly 20 fits the guide positioning part 100*b* via the guide structure (for example, slide into the guide positioning part 100*b*), so that the follow-focus wheel assembly 20 as a whole is positioned in the mounting cavity 100. Specifically, in FIG. 3, two guide positioning parts 100*b* are symmetrically provided in the mounting cavity 100. The two guide positioning parts 100*b* are located on two sides of the operation port 100*a* in the mounting cavity 100 respectively. Correspondingly, the supporting seat 220 is provided with two guide structures fitting the guide positioning parts 100*b*. The guide structure in the embodiments of the present disclosure may be specifically a groove structure.

Further, as shown in FIG. 3, a first fixing part 100*c* near the guide positioning part 100*b* may be provided on the cavity wall of the mounting cavity 100, a fixing structure (not marked in the figure) provided on the supporting member 22 may be connected to the first fixing part 100*c* in a fitting manner through a second fixing member 10*b*, to implement a fixed connection between the first housing 12 and the follow-focus wheel assembly 20. Specifically, the first fixing part 100*c* may be directly connected to a fixing structure provided on the supporting seat 220, or the first fixing part 100*c* may be connected through a connector to the fastening structure provided on the supporting seat 220.

Further, as shown in FIG. 3, a second fixing part 100*d* near the operation port 100*a* may be provided on the cavity wall of the mounting cavity 100, and a fixing structure (not marked in the figure) provided on the mounting seat 222 may be connected to the second fixing part 100*d* in a fitting manner through a third fixing member 10*c*, to further enhance the fixed connection between the first housing 12 and the follow-focus wheel assembly 20. Specifically, the second fixing part 100*d* may be directly connected to the fixing structure provided on the mounting seat 222, or the second fixing part 100*d* may be connected through a connector to the fixing structure provided on the mounting seat 222.

In some exemplary embodiments, as shown in FIG. 3, a movable clamping part 100*e* is further provided on an inner wall of the mounting cavity 100, and after the follow-focus wheel assembly 20 is mounted into the mounting cavity 100, the movable clamping part 100*e* clamps the supporting seat 220, with a clamping direction facing the operation port 100*a*.

In some exemplary embodiments, as shown in FIG. 4, a supporting part 100*f* extending from the operation port 100*a* into the mounting cavity 100 is further provided on the cavity wall of the mounting cavity 100, and after the follow-focus wheel assembly 20 is mounted into the mounting cavity 100, the supporting part 100*f* and the follow-focus wheel 26 abut against each other in an axial direction of the follow-focus wheel 26.

Further, in some exemplary embodiments, as shown in FIG. 3, the handheld device further includes a shielding member 101, the shielding member 101 covers the mounting part B from the outside, and the shielding member 101 is provided with an opening in a size matching that of the operation port 100*a*. The shielding member 101 may cover the peripheries of the structures such as the first fixing part 100*c* and the second fixing part 100*d*, to provide protection, and improve the overall aesthetic perception.

In some exemplary embodiments, as shown in FIG. 4, the first housing 12 is provided with a first button structure 102 near the operation port 100*a*, and the first button structure 102 is connected to the follow-focus plate 24. The first button structure 102 may perform a mechanical operation on the follow-focus plate 24.

In some exemplary embodiments, as shown in FIG. 3, the first housing 12 is further provided with a second button structure 103 near the operation port 100*a*, and the second button structure 103 and the first button structure 102 are located on two sides of the operation port 100*a* respectively. It may be appreciated that, the first button structure 102 and the second button structure 103 may be provided at any suitable positions of the handheld structure as needed. In other embodiments, the first button structure 102 or the second button structure 103 may be set as a communication interface, a charging/discharging interface, or the like, which is not limited herein.

In some exemplary embodiments, as shown in FIG. 2, the second housing 14 may be further provided with a control panel 142, and the control panel 142 may be provided with a control key and/or a display screen, used for operation and/or display in a focusing process.

An assembly process of the handheld device will be described below:

The structure and use process of the present disclosure are described as follows:

The guide member 26b and the supporting member 22 are assembled to form a first pre-assembled member. The follow-focus wheel 26 and the guide member 26a are assembled to form a second pre-assembled member. The first pre-assembled member penetrates the second pre-assembled member and is then locked by the locking member 268, to form a third pre-assembled member. Further, the follow-focus plate 24 is assembled with the third pre-assembled member, to obtain the follow-focus wheel assembly 20. In this stage, the hand feeling and assembly stability of the follow-focus wheel 26 may be adjusted. After the adjustment, the adjusted follow-focus wheel assembly 20 is fixed into the first housing 12. Finally, the second housing 14, the third housing 16, and the shielding member 101 are assembled, to complete the entire assembly.

By arranging a follow-focus plate 24 and a follow-focus wheel 26 respectively on two sides of a supporting seat 220, the follow-focus wheel assembly 20 provided in the present disclosure has a simple and compact structure, and can be miniaturized. When applied to a handheld device, the follow-focus wheel assembly can meet the requirement of performing a focusing operation with a single hand. Due to the simple structure, the structural strength and stability are improved while the operation cost and production cost can be effectively reduced. Moreover, the assembly and disassembly are convenient.

Some exemplary embodiments of the present disclosure provide a photographing system. Referring to FIG. 2 again, the photographing system includes a handheld device 1 and a camera device 2. For the structure of the handheld device 1, reference may be made to the related contents in the foregoing embodiments in combination with FIG. 1 to FIG. 8, and details are not described herein. The handheld device 1 is connected to the camera device 2 in a wireless or wired manner, so as to adjust the focus of the camera device 2 when the camera device 2 is used for photography. In some exemplary embodiments, the camera device 2 further includes a gimbal device. The camera device 2 is mounted on the handheld device 1 via the gimbal device. For example, in the embodiment shown in FIG. 2, the gimbal device is a tri-axial gimbal device, and in other embodiments, the gimbal device may alternatively be a tri-axial or dual-axial gimbal device, which is not limited therein.

With the foregoing handheld device, the photographing system provided in the present disclosure can meet the requirement of performing a focusing operation with a single hand, and can effectively reduce the operation cost and production cost while improving the structural strength and stability. Moreover, the assembly and disassembly are convenient.

Apparently, the embodiments described above are merely a part rather than all of the embodiments of the present disclosure. Preferred embodiments of the present disclosure are provided in the accompanying drawings, and are not intended to limit the scope of the present disclosure. The present disclosure may be implemented in many different ways. The embodiments are provided so that the contents of the present disclosure will be understood more thoroughly and comprehensively. Although the present disclosure is described in detail with reference to the foregoing embodiments, those skilled in the art can still make modifications to the technical solutions described in the foregoing embodiments, or make equivalent replacement to some of the technical features. Any equivalent structure made on the basis of the specification and the accompanying drawings of the present disclosure, and direct or indirect applications thereof in other related technical fields, shall fall within the scope of protection of the present disclosure.

What is claimed is:

1. A handheld follow-focus device, comprising:
   a handheld structure, including:
      a mounting part at a first side of the handheld structure, including an operation port and a control panel, and
      a handheld part at a second side of the handheld structure;
   a connecting part at a first side of the handheld structure and configured to connect to a photographing device; and
   a follow-focus wheel, disposed at the mounting part to adjust a focus of the photographing device, wherein
   a position of the follow-focus wheel and a position of the control panel are arranged to allow a user to operate on the control panel while performing a focusing operation with the follow-focus wheel using a single hand, and the handheld structure includes:
      a first housing,
      a second housing coupled with the first housing to form the handheld part and the mounting part, wherein the mounting part includes a mounting cavity, and the first housing includes the operation port in communication with the mounting cavity at a position corresponding to the mounting cavity, and
      a follow-focus wheel assembly fixed in the mounting cavity.

2. The handheld follow-focus device according to claim 1, wherein the operation port and the control panel is disposed opposite with each other at the first side of the single handheld structure.

3. The handheld follow-focus device according to claim 1, wherein the control panel further includes: at least one of
   a control key for the user to operate with the single hand while the user is performing a focusing operation to the follow-focus wheel with the single hand, or
   a display screen to display while the user is performing a focusing operation to the follow-focus wheel with the single hand.

4. The handheld follow-focus device according to claim 1, wherein a rotation plane of the follow-focus wheel is at an angle other than perpendicular with respect to an axis of the handheld part.

5. The handheld follow-focus device according to claim 1, wherein the handheld follow-focus device is configured to connects to the photographing device wirelessly so as to adjust the focus of the photographing device when the photographing device is in operation.

6. The handheld follow-focus device according to claim 1, further comprising a follow-focus wheel assembly including:
   a supporting member including a supporting seat and a mounting seat extending outward from the supporting seat; and a follow-focus plate on a first side of the mounting seat, wherein the follow-focus wheel is located on a second side of the mounting seat and is rotatable with respect to the follow-focus plate.

7. The handheld follow-focus device according to claim 6, wherein
the mounting seat includes a boss on the second side of the mounting seat;
the boss extends outward from an end portion of a through hole;
the through hole penetrates the mounting seat and the boss; and
the follow-focus wheel passes through the through hole.

8. The handheld follow-focus device according to claim 7, wherein
the follow-focus wheel includes an operation wheel and a rotating shaft coaxially connected to the operation wheel;
an end surface of the operation wheel includes a sinking slot, the sinking slot is coaxial with the rotating shaft and facing the mounting seat;
the rotating shaft passes through the through hole; and
the boss is wholly or partially located in the sinking slot.

9. The handheld follow-focus device according to claim 7, wherein
at least one guide member is disposed inside the through hole; and
the at least one guide member is sleeved over a rotating shaft of the follow-focus wheel to guide the rotating shaft to rotate.

10. The handheld follow-focus device according to claim 9, wherein
an end of the through hole away from the follow-focus plate includes a first step, and
two ends of one of the at least one guide member in an axial direction respectively abut against the first step and the follow-focus wheel.

11. The handheld follow-focus device according to claim 9, wherein the at least one guide member includes at least one of
at least one bearing, or
at least two bushes sheathed with each other.

12. The handheld follow-focus device according to claim 11, wherein
a supporting part extending from the operation port into the mounting cavity is disposed on a cavity wall of the mounting cavity; and
the supporting part and the follow-focus wheel abut against each other in an axial direction of the follow-focus wheel.

13. The handheld follow-focus device according to claim 1, wherein the follow-focus wheel assembly is embedded within a shielding member with only a front portion thereof exposed for operating to control the follow-focus wheel assembly, and the shielding member forms a depression at the front portion.

14. The handheld follow-focus device according to claim 1, wherein the follow-focus wheel assembly includes at least one guide structure; and a cavity wall of the mounting cavity includes at least one guide positioning part coupled with the at least one guide structure, so as to allow the follow-focus wheel assembly to slide into the mounting cavity.

15. The handheld follow-focus device according to claim 14, wherein
the at least one guide positioning part includes two guide positioning parts respectively located on two sides of the operation port.

16. The handheld follow-focus device according to claim 15, wherein the two guide structures are groove structures.

17. The handheld follow-focus device according to claim 14, wherein
a first fixing part adjacent to the guide positioning part is disposed on the cavity wall of the mounting cavity; and
a first fixing structure of the follow-focus wheel assembly is engaged with the first fixing part to fixedly connect the first housing with the follow-focus wheel assembly.

18. The handheld follow-focus device according to claim 17, wherein
the first fixing part is directly connected to the first fixing structure; or
the first fixing part is connected to the first fixing structure via a first connector.

19. The handheld follow-focus device according to claim 1, wherein a second fixing part adjacent to the operation port is disposed on the cavity wall of the mounting cavity; and a second fixing structure of the follow-focus wheel assembly is engaged with the second fixing part to fixedly connect the first housing with the follow-focus wheel assembly.

20. The handheld follow-focus device according to claim 19, wherein
the second fixing part is directly connected to the second fixing structure; or
the second fixing part is connected to the second fixing structure via a second connector.

* * * * *